US012696070B2

(12) United States Patent
Hong

(10) Patent No.: US 12,696,070 B2
(45) Date of Patent: Jul. 28, 2026

(54) RADIO NOTIFICATION AREA (RNA) UPDATING FOR TERMINAL AND INFORMATION PROCESSING METHOD AND APPARATUS

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 588 days.

(21) Appl. No.: 17/927,302

(22) PCT Filed: May 27, 2020

(86) PCT No.: PCT/CN2020/092735
§ 371 (c)(1),
(2) Date: Nov. 22, 2022

(87) PCT Pub. No.: WO2021/237541
PCT Pub. Date: Dec. 2, 2021

(65) Prior Publication Data
US 2023/0199475 A1     Jun. 22, 2023

(51) Int. Cl.
*H04W 8/18*        (2009.01)
*H04W 88/06*       (2009.01)

(52) U.S. Cl.
CPC ............ *H04W 8/183* (2013.01); *H04W 88/06* (2013.01)

(58) Field of Classification Search
CPC . H04W 88/06; H04W 76/27; H04W 36/0058; H04W 48/20; H04W 68/08; H04W 68/02; H04W 68/00; H04W 12/45; H04W 36/08; H04W 68/12
See application file for complete search history.

(56) References Cited

U.S. PATENT DOCUMENTS

| | | | |
|---|---|---|---|
| 2013/0185166 | A1 | 7/2013 | Larkin |
| 2019/0350033 | A1 | 11/2019 | Wu |
| 2020/0068646 | A1 | 2/2020 | Kwon |
| 2022/0417728 | A1* | 12/2022 | Wu ........................ H04W 12/06 |

FOREIGN PATENT DOCUMENTS

| | | |
|---|---|---|
| CN | 103379584 A | 10/2013 |
| CN | 106793089 A | 5/2017 |
| CN | 109699050 A | 4/2019 |
| CN | 110214461 A | 9/2019 |
| CN | 110431863 A | 11/2019 |
| CN | 110546993 A | 12/2019 |
| CN | 110603858 A | 12/2019 |

(Continued)

OTHER PUBLICATIONS

Chinese Office Action issued on Feb. 9, 2023 for Chinese Patent Application No. 2020800010929.

(Continued)

*Primary Examiner* — Gary Lafontant
(74) *Attorney, Agent, or Firm* — Volpe Koenig

(57)        ABSTRACT
A RNA updating method for a terminal, which includes: performing RNA updating by using a first subscriber identification module (SIM) in an inactive state of a multi-SIM terminal to replace at least one second SIM in the inactive state in the multi-SIM terminal.

18 Claims, 9 Drawing Sheets

(56)                 References Cited

FOREIGN PATENT DOCUMENTS

| CN | 110677900 | A | 1/2020 |
| CN | 110741673 | A | 1/2020 |
| CN | 111031563 | A | 4/2020 |
| CN | 111149377 | A | 5/2020 |
| CN | 110692263 | A | 1/2021 |
| WO | 2018126801 | A1 | 7/2018 |

OTHER PUBLICATIONS

"Remaining issues on RAN-based notification area update procedure", 3GPP TSG-RAN WG2 Meeting #101bis, Fujitsu, R2-1804946 (2018).
GSMA. "Requirements for Multi SIM Devices, Version 5.0" GSM Association Official Document TS.37, Dec. 4, 2018 (Dec. 4, 2018) Full text; Type-A.

\* cited by examiner

| Base station | | | | Multi-SIM terminal |
| --- | --- | --- | --- | --- |

S110, an RNA update is performed by using a first SIM in an inactive state of a multi-SIM terminal to represent at least one second SIM in the inactive state in the multi-SIM terminal

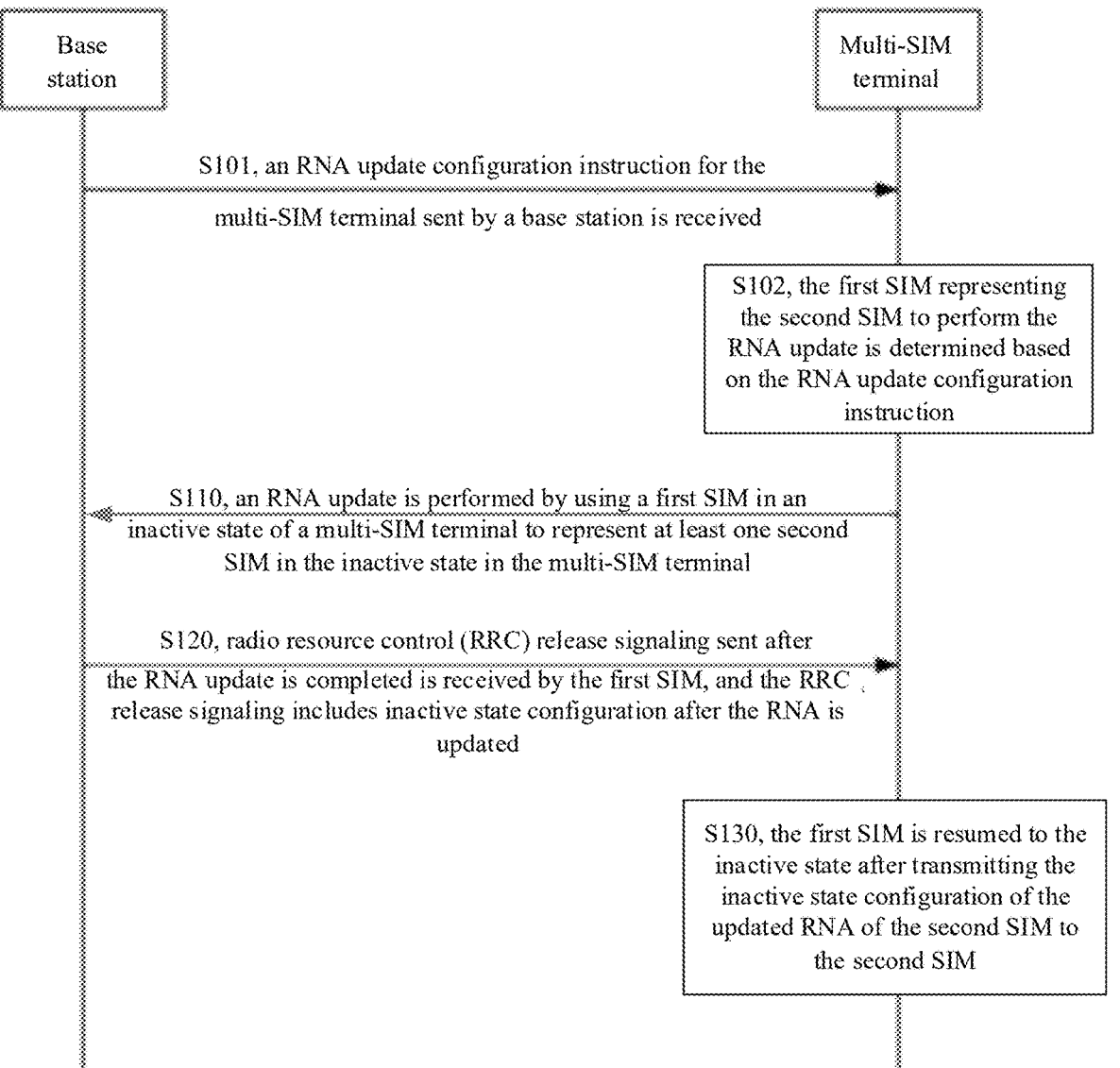

Base
station

Multi-SIM
terminal

S101, an RNA update configuration instruction for the
multi-SIM terminal sent by a base station is received S102, the first SIM representing
the second SIM to perform the
RNA update is determined based
on the RNA update configuration
instruction S110, an RNA update is performed by using a first SIM in an
inactive state of a multi-SIM terminal to represent at least one second
SIM in the inactive state in the multi-SIM terminal S120, radio resource control (RRC) release signaling sent after
the RNA update is completed is received by the first SIM, and the RRC
release signaling includes inactive state configuration after the RNA is
updated S130, the first SIM is resumed to the
inactive state after transmitting the
inactive state configuration of the
updated RNA of the second SIM to
the second SIM

FIG. 4

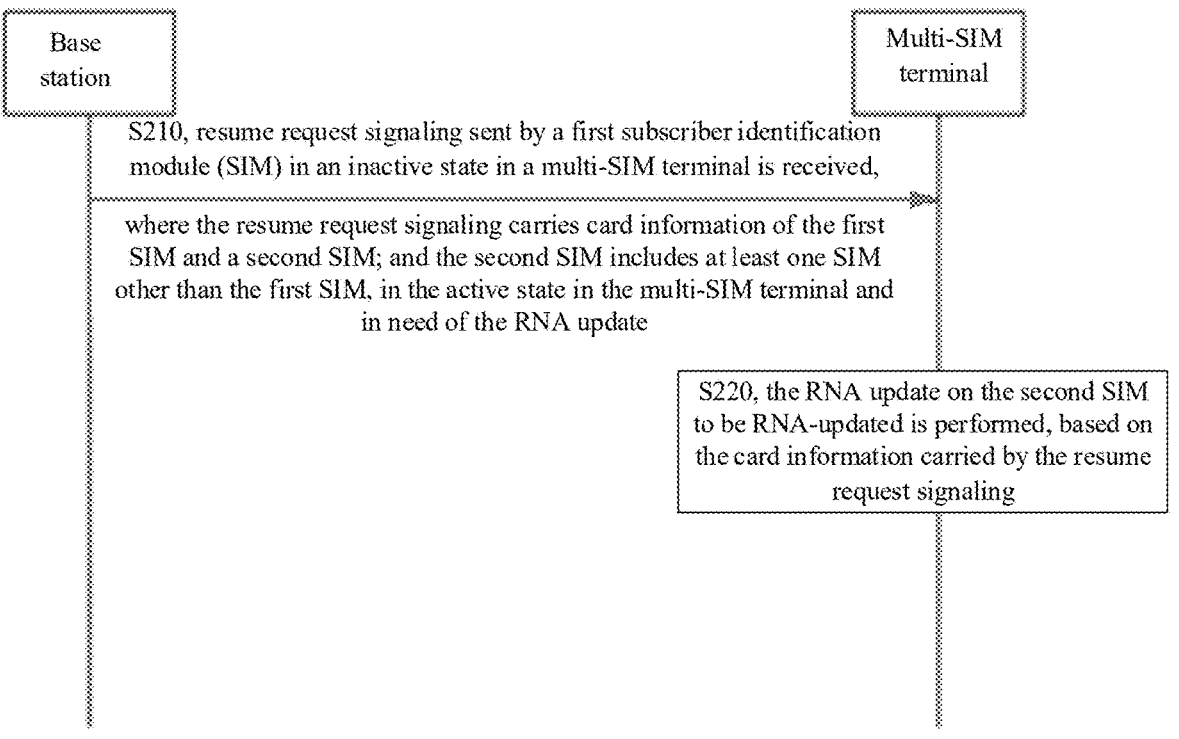

S210, resume request signaling sent by a first subscriber identification module (SIM) in an inactive state in a multi-SIM terminal is received, where the resume request signaling carries card information of the first SIM and a second SIM; and the second SIM includes at least one SIM other than the first SIM, in the active state in the multi-SIM terminal and in need of the RNA update S220, the RNA update on the second SIM to be RNA-updated is performed, based on the card information carried by the resume request signaling

FIG. 5

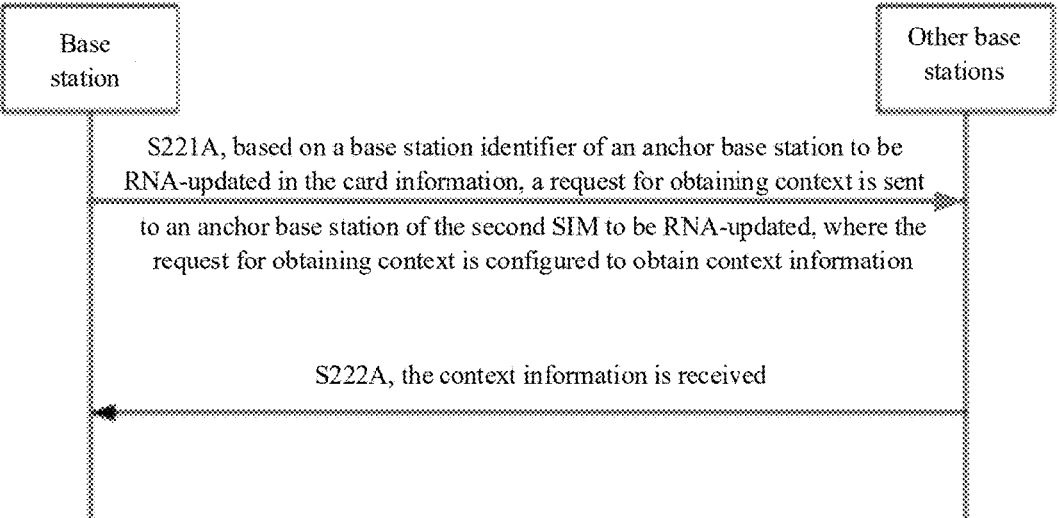

S221A, based on a base station identifier of an anchor base station to be RNA-updated in the card information, a request for obtaining context is sent to an anchor base station of the second SIM to be RNA-updated, where the request for obtaining context is configured to obtain context information S222A, the context information is received

FIG. 6A

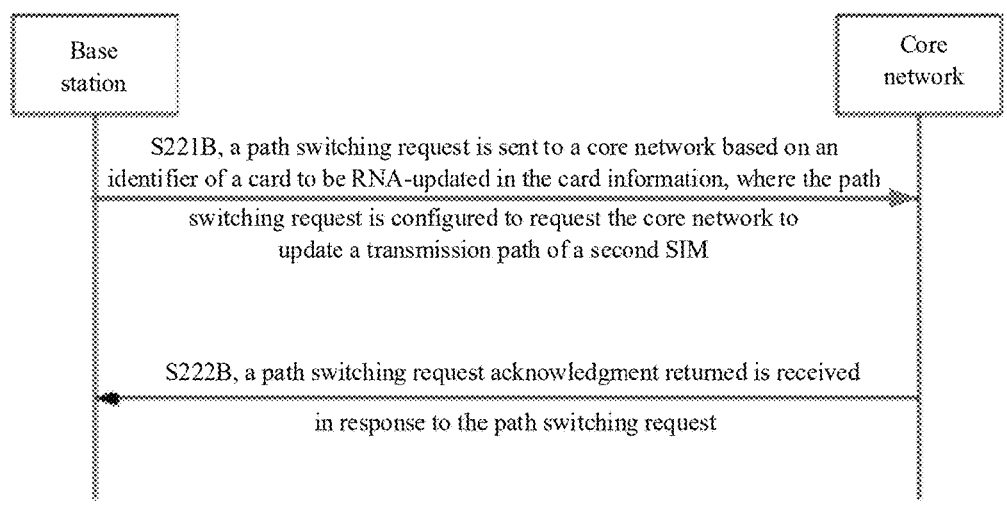

Base station

Core network

S221B, a path switching request is sent to a core network based on an identifier of a card to be RNA-updated in the card information, where the path switching request is configured to request the core network to update a transmission path of a second SIM S222B, a path switching request acknowledgment returned is received in response to the path switching request

FIG. 6B

Base station

Multi-SIM terminal

S210, resume request signaling sent by a first subscriber identification module (SIM) in an inactive state in a multi-SIM terminal is received, where the resume request signaling carries card information of the first SIM and a second SIM; and the second SIM includes at least one SIM other than the first SIM, in the active state in the multi-SIM terminal and in need of the RNA update S220, the RNA update on the second SIM to be RNA-updated is performed, based on the card information carried by the resume request signaling S230, radio resource control (RRC) release signaling is sent to the first SIM after the release signaling completes the RNA update, and the RRC release signaling includes inactive state configuration after the RNA is updated

FIG. 7

RADIO NOTIFICATION AREA (RNA) UPDATING FOR TERMINAL AND INFORMATION PROCESSING METHOD AND APPARATUS

CROSS REFERENCE TO RELATED APPLICATION

The present application is a U.S. National Stage of International Application No. PCT/CN2020/092735, filed on May 27, 2020, the entire content of which is incorporated herein by reference for all purposes.

BACKGROUND

A new radio resource control (RRC) state is introduced into the 5$^{th}$ generation (5G) mobile communication new radio (NR), that is, an RRC inactive (RRC_INACTIVE) state, which is also called an inactive state for short. Under the inactive state, when a terminal is in the state, a non-access stratum (NAS) of the terminal still remains in a connected state (connection between the terminal and a core network is still remained), radio connection of the terminal is disconnected, and a base station side retains context information of the terminal and retains next generation (NG) connection between the terminal and the core network. The terminal may move within an area range configured by the base station without notifying the network to save signaling overhead. When the terminal enters the inactive state, the last serving base station stores context of the terminal and is connected to the next generation (NG) of a serving core network, and an access stratum (AS) of the terminal also retains corresponding context information including bearing, an identifier in the inactive state, an attribution area, etc. In such a manner, the base station may page the terminal in the inactive state by a radio access network paging mechanism within the configured area, and the terminal may rapidly recover data transmission based on the context information stored on the terminal side and the base station side, to implement low-latency transmission.

SUMMARY

The embodiments of the present disclosure disclose a method for updating a radio notification area (RNA) for a terminal, a method for processing information, a communication device, and a storage medium.

According to a first aspect of an embodiment of the present disclosure, a method for updating a radio notification area (RNA) for a terminal is provided and includes: performing an RNA update by using a first subscriber identification module (SIM) in an inactive state of a multi-SIM terminal to replace at least one second SIM in the inactive state in the multi-SIM terminal.

According to a second aspect of an embodiment of the present disclosure, a method for processing information is provided, and includes: receiving resume request signaling sent by a first subscriber identification module (SIM) in an inactive state in a multi-SIM terminal, where the resume request signaling carries card information of the first SIM and a second SIM; and the second SIM is at least one SIM that is in the multi-SIM terminal, needs RNA update, is in the inactive state, and is in addition to the first SIM; and performing the RNA update on a second SIM to be RNA-updated based on the card information carried by the resume request signaling.

According to a third aspect of an embodiment of the present disclosure, a communication device is provided, and includes: a transceiver; a memory; and a processor, which is respectively connected to the transceiver and the memory. The processor is configured to execute computer-executable instructions in the memory to: control radio signal transceiving of the transceiver and perform an RNA update by using a first subscriber identification module (SIM) in an inactive state of a multi-SIM terminal to replace at least one second SIM in the inactive state in the multi-SIM terminal.

According to a fourth aspect of an embodiment of the present disclosure, a non-transitory computer storage medium storing computer-executable instructions is provided; and after the computer-executable instructions are executed by a processor, the processor is caused to implement any technical solutions according to the foregoing first aspect or second aspect.

BRIEF DESCRIPTION OF THE DRAWINGS

The accompanying drawings are incorporated into the specification and constitute a part of the specification, show embodiments consistent with the present disclosure, and are used to explain the principle of the embodiments of the present disclosure together with the specification.

FIG. 4 is a schematic flowchart of a method for updating an RNA for a terminal according to an example;

FIG. 5 is a schematic flowchart of a method for processing information according to an example;

FIG. 6A is a schematic flowchart of a method for processing information according to an example;

FIG. 6B is a schematic flowchart of a method for processing information according to an example;

FIG. 7 is a schematic flowchart of a method for processing information according to an example;

DETAILED DESCRIPTION

Examples will be described in detail, and are shown in the accompanying drawings. When the following descriptions refer to the drawings, the same numbers in different drawings indicate the same or similar elements, unless otherwise indicated. Implementations described in the following examples do not represent all implementations consistent with the embodiments of the present disclosure. Instead, they are merely examples of apparatuses and methods consistent with some aspects of the embodiments of the present disclosure described as detailed in the appended claims.

The terms used in the embodiments of the present disclosure are merely for the purpose of describing specific embodiments and are not intended to limit the embodiments of the present disclosure. The terms "a/an" and "the" in the singular form used in the embodiments of the present disclosure and the appended claims are also intended to include the plural form, unless otherwise clearly indicated in the context. It should further be understood that the term "and/or" used in the present disclosure refers to and includes any or all possible combinations of one or more of the associated listed items.

It should be understood that although the terms "first," "second," "third", etc. may be used in the embodiments of the present disclosure to describe various information, the information should not be limited to these terms. These terms are merely used to distinguish the same type of information from one another. For example, without departing from the scope of the embodiments of the present disclosure, the first information may also be referred to as second information, and similarly, the second information may also be referred to as first information. Depending on the context, the words "if" and "in case" as used may be interpreted as "when" or "upon" or "in response to determining."

The embodiments of the present disclosure relate to the field of radio communications but are not limited to the field of radio communications, and in particular, relate to a method and apparatus for updating a radio notification area (RNA) for a terminal, a method and apparatus for processing information, a communication device, and a storage medium.

To better describe any embodiments of the present disclosure, an embodiment of the present disclosure uses an application scenario of an ammeter intelligent control system as an example to perform an example description.

Figures 1, 2:
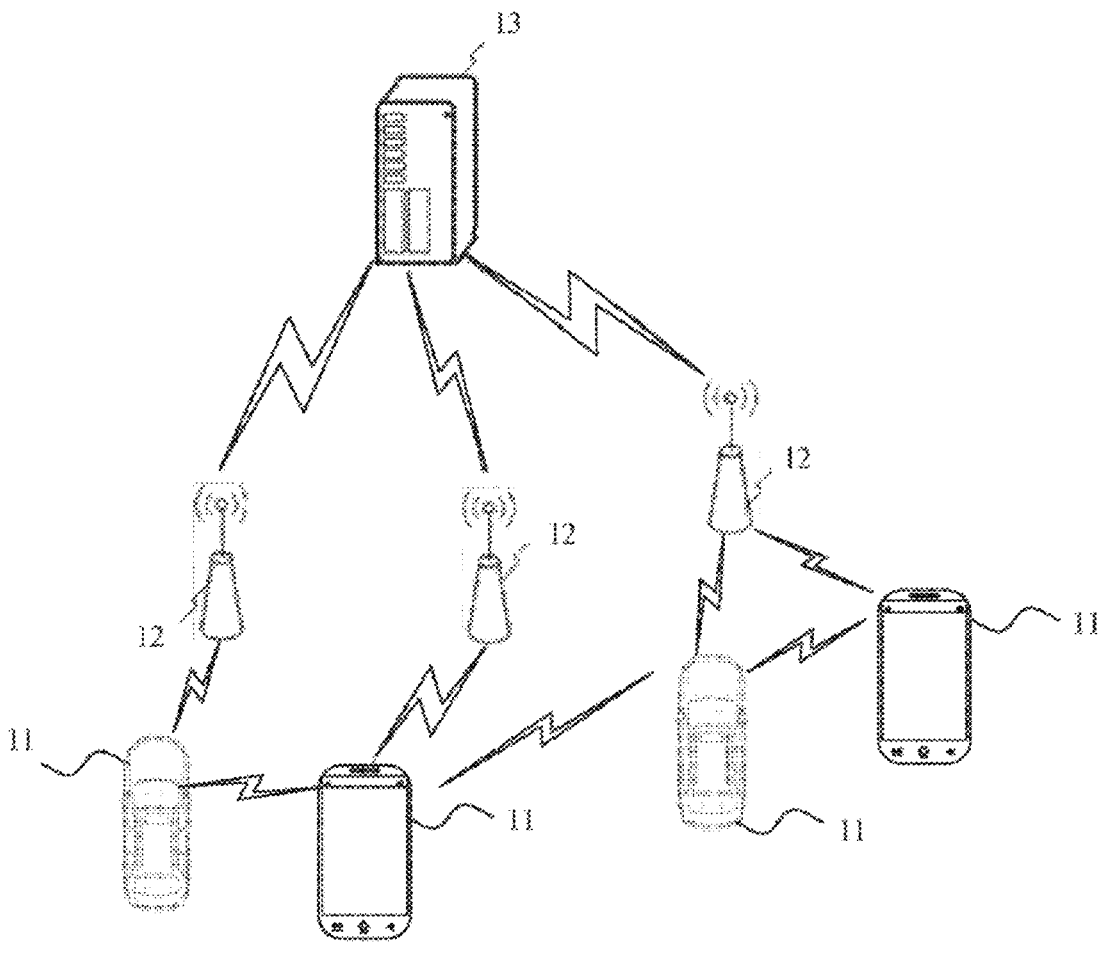
FIG. 1 is a schematic structural diagram of a radio communication system according to an example.
FIG. 2 is a schematic flowchart of a method for updating an RNA for a terminal according to an example.

Referring to FIG. 1, which shows a schematic structural diagram of a radio communication system according to an embodiment of the present disclosure. As shown in FIG. 1, the radio communication system is a communication system based on a cellular mobile communication technology and may include: a plurality of terminals 1 land a plurality of base stations 12.

The terminal 11 may refer to a device for providing voice and/or data connectivity for a user. The terminal 11 may be in communication with one or more core networks via a radio access network (RAN), and the terminal 11 may be an Internet of Things terminal, such as a sensor device, a mobile phone (or "cellular" phone), and a computer having the Internet of Things terminal, for example, may be a fixed, portable, pocket, handheld, computer built-in, or vehicle-mounted apparatus. For example, a station (STA), a subscriber unit, a subscriber station, a mobile station, a mobile, a remote station, an access point, a remote terminal, an access terminal, a user apparatus, a user agent, a user device, or a user terminal. Or the terminal 11 may also be an unmanned aerial vehicle device. Or the terminal 11 may also be a vehicle-mounted device, for example, a trip computer having a radio communication function, or a radio terminal connected to the trip computer externally. Or the terminal 11 may also be a roadside device, for example, a street lamp having the radio communication function, a signal light, or other roadside devices.

The base station 12 may be a network-side device in the radio communication system. The radio communication system may be the 4$^{th}$ generation mobile communication technology (4G) system, also referred to as a long-term evolution (LTE) system; or, the radio communication system may also be a 5G system, also referred to as a new radio (NR) system or a 5G NR system. Or the radio communication system may also be a next-generation system of the 5G system. An access network in the 5G system may be referred to as a new generation radio access network (NG-RAN).

The base station 12 may be an evolved base station (eNB) used in the 4G system. Or the base station 12 may also be a base station using a centralized distribution architecture (gNB) in the 5G system. When the base station 12 uses the concentrated distribution architecture, a central unit (CU) and at least two distributed units (DU) are usually included. The central unit is provided with protocol stacks of a packet data convergence protocol (PDCP) layer, a radio link control (RLC) protocol layer, and a media access control (MAC) layer; and the distributed unit is provided with a protocol stack of a physical (PHY) layer, and the embodiments of the present disclosure do not limit the specific implementations of the base station 12.

A radio connection between the base station 12 and the terminal 11 may be established by a radio air interface. In different implementations, the radio air interface is a radio air interface based on the 4$^{th}$ generation mobile communication network technology (4G) standard, or the radio air interface is a radio air interface based on the 5$^{th}$ generation mobile communication network technology (5G) standard, for example, the radio air interface is a new radio; or the radio air interface may also be a radio air interface based on a further next generation mobile communication network technology standard of 5G.

In some embodiments, an end-to-end (E2E) connection may further be established between the terminals 11. For example, scenarios such as vehicle-to-vehicle (V2V) communication, vehicle-to-infrastructure (V2I) communication, and vehicle-to-pedestrian (V2P) communication in vehicle-to-everything (V2X) communication.

In some embodiments, the above radio communication system further includes a network management device 13.

A plurality of base station 12 are connected with the network management device 13 respectively, where the network management device 13 may be a core network device of the radio communication system, for example, the network management device 13 may be a mobility management entity (MME) in an evolved packet core network (EPC), or the network management device may also be other core network devices, such as a serving gateway (SGW), a public data network gateway (PGW), a policy and charging rules function (PCRF) unit, or a home subscriber server (HSS). The embodiments of the present disclosure do not limit an implementation form of the network management device 13.

As shown in FIG. 2, an embodiment of the present disclosure provides a method for updating a radio notification area (RNA) for a terminal. The method includes the following step S110.

In step S110, an RNA update is performed by using a first SIM in an inactive state of a multi-SIM terminal to replace at least one second SIM in the inactive state in the multi-SIM terminal.

The method for updating the RNA may be applied to various types of terminals. For example, terminals include, but are not limited to, a phone and a tablet computer carried by a user, a wearable device, a vehicle-mounted terminal, or a physical network terminal.

The terminal is a terminal including a plurality of SIMs. The SIMs include but are not limited to: a SIM that may be separated from the terminal separately, and/or an eSIM.

The SIMs included in the multi-SIM terminal may be at least two SIMs, and specifically may be three or four, or more SIMs.

The first SIM and the second SIM are different SIMs in the multi-SIM terminal. The first SIM and the second SIM may be different SIMs provided by the same communication operator or the SIMs provided by different communication operators. If the different SIMs provided by the same operator may be connected to SIMs with the same network, for example, the first SIM and the second SIM are connected to the same public land mobile network (PLMN). The first SIM and the second SIM may be SIMs that can access different PLMNs.

According to the technical solutions provided in the embodiments of the present disclosure, RNA update is performed by using a first SIM in an inactive state to replace or replace one or more second SIMs, and with respect to the first SIM and the second SIM respectively performing RNA update in the inactive state, the second SIM does not need to perform information interaction with a base station during an RNA update process, which may reduce power consumption of the second SIM, such that power consumption of a terminal is reduced, and standby duration of the terminal is prolonged.

The number of the first SIM is one, and the number of the second SIM is one or more.

The inactive state is a low-power consumption state. In an embodiment of the present disclosure, if the multi-SIM terminal includes a plurality of SIMs in the inactive state, when one first SIM is used to perform RNA update, the first SIM may further replace other SIMs to perform the RNA update.

The RNA update includes at least one of the following: a transmission path between the SIM and a core network (CN); an update of an anchor base station of the SIM; and a change of a base station stored in the context of the SIM.

In some embodiments, the method further includes: if a SIM in an RRC connected state (a connected state for short) exists in the multi-SIM terminal, the RNA update is performed by using the SIM in the connected state to replace each SIM in the inactive state, such that longer continuous sleep time of the SIM in the inactive state may further reduce power consumption of the terminal.

In some other embodiments, S110 may include that if the SIM in the RRC connected state does not exist in the multi-SIM terminal, the RNA update is performed by selecting one first SIM to replace (or represent) one or more second SIMs.

In another words, the RNA update is performed by using one first SIM to replace or represent one or more second SIMs, and then the second SIM does not need to implement information interaction with the base station in a RNA update process to reduce power consumption of the second SIM, such that the consumption of the terminal is reduced and standby duration of the terminal is prolonged.

In some embodiments, the first SIM may be a default SIM, or may be a SIM selected based on usage frequency and master-slave configuration of a plurality of SIMs and/or usage condition information of paid fees of the plurality of SIMs in the multi-SIM terminal.

For example, the first SIM may be a SIM with the highest usage frequency. For another example, the SIMs in the multi-SIM terminal may be divided into a master SIM and a slave SIM, and the first SIM may be the master SIM.

Specifically, the master-slave configuration is determined based on an indication of a user; for example, a certain SIM is configured as the master SIM based on the instruction of the user, and the remaining SIM is the slave SIM.

Taking the multi-SIM terminal being a dual-SIM terminal as an example, one SIM is mainly used for working communication on working days, and the other SIM is mainly used for life communication on non-working days. At this time, on working days, the master SIM may be used as the SIM mainly used for working communication by default, and on non-working days, the SIM mainly used for life communication may be the first SIM by default.

Due to the RNA update on the first SIM, which may be implemented by oneself, a SIM with high usage frequency or a more important communication service based on time segments is set to the first SIM, which may ensure that the RNA update on the first SIM is more guaranteed.

Figure 3:
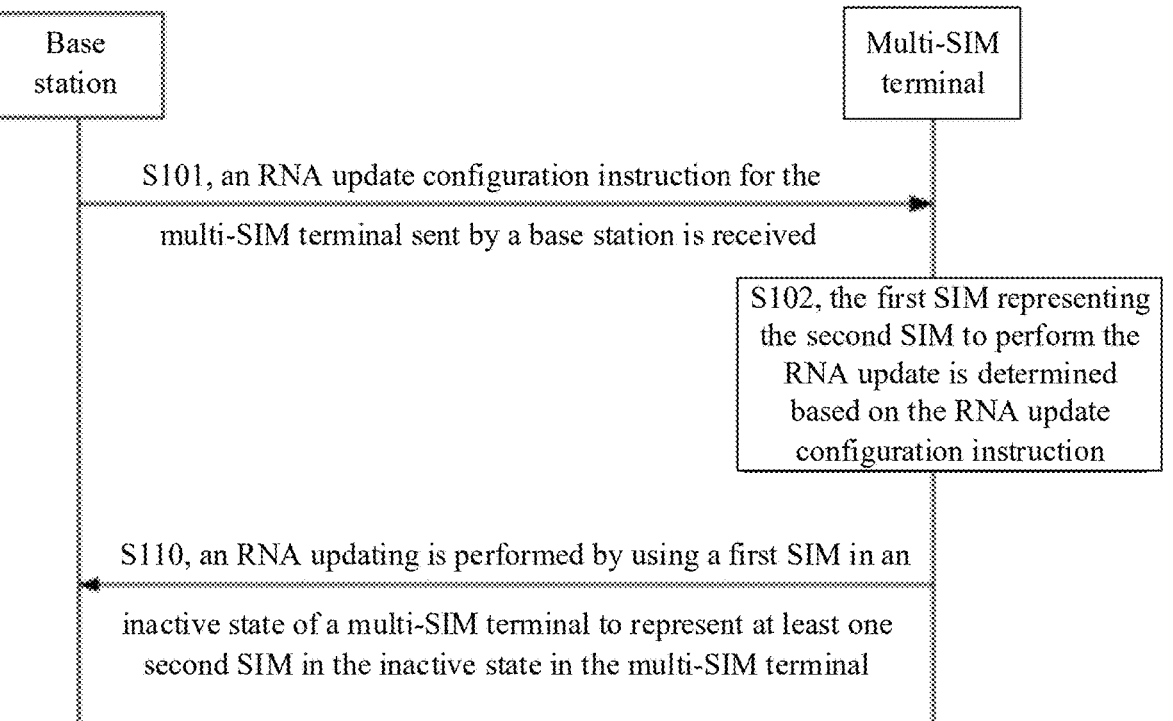
FIG. 3 is a schematic flowchart of a method for updating an RNA for a terminal according to an example.

In some embodiments, as shown in FIG. 3, the method further includes steps S103 and S102.

In step S101, an RNA update configuration instruction for the multi-SIM terminal sent by a base station is received.

In step S102, the first SIM replacing the second SIM to perform the RNA update is determined based on the RNA update configuration instruction.

The RNA update configuration instruction may be used to indicate that the first SIM in the multi-SIM terminal replaces at least one second SIM in the multi-SIM terminal to perform the RNA update.

In some embodiments, the first SIM is configured by an RNA update configuration instruction on the network side. The RNA update configuration instruction indicates which SIM is used as the first SIM. For example, in some embodiments, a SIM of the RNA update configuration instruction received from a base station is the first SIM, and the remaining SIM may be the second SIM.

The RNA update configuration instruction may be carried in release signaling of the base station triggering the SIM to enter an inactive state, and in this way, the SIM may receive the release signaling before exiting a connected state, and other signaling does not need to carry the RNA update configuration instruction.

Any one of the SIMs in the multi-SIM terminal may receive the RNA update configuration instruction.

In some embodiments, the base station may carry the RNA update configuration instruction in the release signaling of the last SIM entering the inactive state of the multi-SIM terminal. At this time, the RNA update configuration instruction may indicate the last SIM entering the inactive state to be the first SIM, or may indicate another SIM first entering the inactive state to be the first SIM.

If a SIM receiving the RNA update configuration instruction is determined as the first SIM, the RNA update configuration instruction may merely include one indication bit, and whether the SIM is indicated to be the first SIM is determined by two bit values of one instruction bit. If the RNA update configuration instruction is carried in the release signaling of triggering the SIM to enter the inactive state, due to only one bit existing in the RNA update configuration instruction, issuance of the RNA update configuration instruction may be completed in a case of not increasing a length of the release signaling or only increasing one bit. If the release signaling has a retained bit, the retained bit of the release signaling may be used to carry the RNA update configuration instruction.

Certainly, the number of bits corresponding to the RNA update configuration instruction may also be more.

In another embodiment, the RNA update configuration instruction may carry an identifier of a card indicated to be the first SIM, and the identifier of a card may be an inactive-radio network temporary identifier (I-RNTI) or a temporary mobile subscriber identifier (TMSI). If the identifier of a card is carried, the multi-SIM terminal may determine the first SIM based on the identifier of a card carried by the RNA update configuration instruction when determining the first SIM.

In another embodiment, the SIM that first enters the inactive state receives the RNA update configuration instruction. At this time, the RNA update configuration instruction may indicate the SIM first entering the inactive state to be the first SIM.

In some embodiments, if the RNA update configuration instruction indicates which SIM in the multi-SIM terminal to be the first SIM, by default, paging configuration and/or RNA update configuration in inactive state configuration of the first SIM is inactive state configuration when the RNA update configuration is performed by using the first SIM to replace the second SIM. Thus, the first SIM does not need to additionally obtain the inactive state configuration of the second SIM.

In some embodiments, as shown in FIG. 3, the S110 may include steps S111 and S112. In step S111, signal measurement of the multi-SIM terminal is performed by the first SIM. In step S112, in response to the signal measurement of the multi-SIM terminal triggering the RNA update, the RNA update is performed by using the first SIM to replace at least one second SIM. The "in response to the signal measurement of the multi-SIM terminal triggering the RNA update" may be understood as "when the signal measurement of the multi-SIM terminal triggers RNA update."

The signal measurement may include a cell reference signal measurement. When the multi-SIM terminal is at the boundary of two RNAs, whether an anchor base station of the SIM needs to be changed may be determined by the cell reference signal measurement, and if the anchor base station of the SIM needs to be changed, the RNA update needs to be performed.

A cell reference signal includes, but is not limited to, measurement of a channel state indication-reference signal (CSI-RS). If the signal strength of the signal receiving power of the measured CSI-RS and the like is less than a preset threshold, it is determined that the anchor base station of the SIM needs to be changed.

The first SIM needs to know information of an RNA where the second SIM is in to determine which second cards need to perform the RNA update, for example, whether a current terminal is at the boundary of the RNA of the second SIM may be determined by the RNA information.

In some embodiments, if the RNA information of the first SIM and the second SIM is different, the first SIM needs to read at least the RNA information of the second SIM.

If the first SIM fails to obtain the RNA information of the second SIM, it may be thought that the RNA information of the first SIM and the second SIM are the same. At this time, if the first SIM measures that the signal quality of the first SIM is poor enough to perform the RNA update, it is synchronously thought that other second SIMs also need to perform the RNA update.

The inactive state configuration may include: various configuration information used by the base station for the SIM in the inactive state. The inactive state configuration includes but is not limited to: an identifier of a card used by each SIM in the inactive state, which may include: an I-PNTI, the RNA information of the SIM, and/or paging configuration, etc.

The RNA information may be used to indicate a current RNA the SIM is in. The RNA may be a regional range of paging the SIM.

The paging configuration may be used to determine a paging opportunity for paging the SIM in the inactive state.

In some embodiments, the S111 may include: before the first SIM enters the inactive state, the first SIM receiving the inactive state configuration of the second SIM from the base station by the first SIM; or in response to the first SIM is determined to replace the second SIM to perform the RNA update, reading the inactive state configuration of the second SIM from the second SIM by the first SIM, where a multi-SIM terminal RNA update configuration instruction is used to indicate one SIM in the multi-SIM terminal to replace the SIM in the multi-SIM terminal to perform the RNA update.

The inactive state configuration of the second SIM may be sent to the first SIM by the base station, or may be read by the first SIM from the second SIM. There may be various kinds of opportunities for obtaining the second SIM by the first SIM, for example, which may be determined based on the configuration of the base station, or may be determined by the terminal itself.

For example, in some cases, the first SIM may read from the second SIM by itself when the first SIM is determined to replace the second SIM to perform the RNA update, or may read from a corresponding second SIM when it is determined that the RNA update needs to be performed. Thus, the first SIM reading the inactive state configuration of the second SIM from the second SIM includes:

reading the inactive state configuration of the second SIM from the second SIM by the first SIM after it is determined that the first SIM replaces the second SIM to perform the RNA update, or reading the inactive state configuration of the second SIM from the second SIM by the first SIM when the first SIM is to be RNA-updated.

In some embodiments, the performing the RNA update by using the first SIM to replace at least one second SIM includes: resume request signaling is sent by the first SIM, where the resume request signaling includes: card information of the first SIM and card information of the second SIM; and the resume request signaling is used to trigger the base station to perform the RNA update on the first SIM and the second SIM based on the card information of the first SIM and the second SIM.

When the RNA update is performed, a resume request needs to be sent to request the base station to perform the RNA update.

The card information may include: various information required for the base station to perform the RNA update on the SIM. For example, the card information includes, but is not limited to: the I-RNTI of the SIM, a base station identifier of the anchor base station connected to the SIM currently, etc.

The card information may be used to receive the resume request signaling and perform the RNA update of the network side on the SIM.

In an embodiment of the present disclosure, the resume request signaling carries card information of one or more SIMs to be RNA-updated. The card information may include: the I-RNTI of the SIMs to be RNA-updated.

In some other embodiments, the card information of the first SIM and the second SIM may further carry the base station identifier of the anchor base station connected to the first SIM and the second SIM currently.

If the base station identifier of the anchor base station currently connected to the first SIM and the second SIM is recorded on the network side, reported card information may also not include the base station identifier. For example, a current base station may request a core network for the base station identifier of the anchor base station connected to the first SIM and/or the second SIM currently, to facilitate obtaining context information of the first SIM and/or the second SIM from a corresponding base station. Specifically, when the current base station requests the core network for switching a transmission path of the SIM, the current base station requests for the base station identifier of the anchor base station of the SIM before the switching simultaneously, and in this way, the current base station may simultaneously receive a switching response indicating whether the switching successes in a switching request response of the transmission path and receives the base station identifier of the anchor base station of the SIM before the switching. And then the base station identifier obtained based on this manner is sent to a corresponding base station to request context information of the SIM.

Certainly, the above is merely taken as an example, and there are various kinds of specific implementations, which are not limited to any one of the above.

Thus, in some embodiments, the card information of the first SIM includes: the identifier of a card of the first SIM and/or the base station identifier of the anchor base station of the first SIM; and/or the card information of the second SIM includes: the identifier of a card of the second SIM and/or the base station identifier of the anchor base station of the second SIM.

In some embodiments, the method further includes receiving the inactive state configuration sent by the base station after the RNA update is completed.

Specific content of the inactive state configuration may refer to any one of the foregoing embodiments.

In other embodiments, as shown in FIG. 4, the method further includes steps S120 and S130.

In step S120, radio resource control (RRC) release signaling sent after the RNA update is completed is received by the first SIM, and the RRC release signaling includes inactive state configuration after the RNA is updated.

In step S130, the first SIM is resumed to the inactive state after transmitting the inactive state configuration of the updated RNA of the second SIM to the second SIM.

After the first SIM sends resume request signaling, a base station and/or a multi-SIM terminal may determine an entered state based on a current communication need by itself, and at this time, the entered state includes but is not limited to: an RRC connected state, an idle state, and/or the inactive state.

Generally, the multi-SIM terminal itself has no data to report, or the base station has no data to send to the first SIM, which may make the first SIM resume the inactive state or enter the idle state. The RRC release signaling is a triggering signaling for triggering the first SIM to resume the inactive state or enter the idle state.

In an embodiment of the present disclosure, the RRC release signaling carries the inactive state configuration after the RNA is updated. Due to the update of the RNA of the SIM, RNA information in the inactive state configuration at least needs to be updated, and changing the RNA information at least indicates an RNA of the SIM after the RNA is updated.

In some cases, a network side may set different inactive state configurations for different RNAs, such as paging configuration in the inactive state configuration. The paging configuration at least includes a paging cycle.

In some other embodiments, the inactive state configuration may further include: timer configuration of an inactive timer, and the timer configuration may at least include the timing duration of the timer.

Certainly, the example is merely for describing the inactive state configuration, and is not limited specifically.

In some embodiments, the method further includes: based on the inactive state configuration of the second SIM, the first SIM monitors a paging message of the second SIM at a paging opportunity of the second SIM.

In an embodiment of the present disclosure, the first SIM not only replaces the second SIM to perform RNA update, but also replaces the second SIM to receive the paging message of the second SIM at the paging opportunity of the second SIM. Specifically, a process of the first SIM awakening the second SIM based on the received paging message includes but is not limited to: the first SIM may report to a processor of the terminal when receiving the paging message for paging the second SIM, and the processor may trigger the second SIM to perform state switching based on the paging message, for example, exiting the inactive state and entering the RRC connected state.

Receiving the paging message of the second SIM by using the first SIM to replace the second SIM may again reduce the power consumption generated by the second SIM waking up at its paging opportunity to monitor the paging message, such that the power consumption of the terminal is saved and the standby duration of the terminal is prolonged.

In some embodiments, the inactive state configuration of the first SIM is the same as the inactive state configuration of the second SIM. The inactive state configuration includes: RNA information used to determine an RNA, and a paging configuration used to determine the paging opportunity for receiving the paging message.

The example is for describing the inactive state configuration, and a specific implementation is not limited.

In some embodiments, the first SIM and the second SIM may have the same inactive state configuration, and in this way, the first SIM may perform signal measurement of RNA update, whether to trigger determination of the RNA update and/or monitoring of the paging message according to the inactive state configuration of the first SIM when performing the same. In view of this, not only power consumption of the second SIM may be reduced, but also power consumption of the first SIM may further be reduced, such that power consumption of the multi-SIM terminal is reduced as a whole, and the standby duration of the terminal is improved.

As shown in FIG. 5, an embodiment of the present disclosure provides a method for processing information, including steps S210 and S220.

In step S210, resume request signaling sent by a first subscriber identification module (SIM) in an inactive state in a multi-SIM terminal is received, where the resume request signaling carries card information of the first SIM and a second SIM; and the second SIM includes at least one SIM other than the first SIM, in the active state in the multi-SIM terminal and in need of the RNA update.

In S220, the RNA update on the second SIM to be RNA-updated is performed, based on the card information carried by the resume request signaling.

The method for processing the information according to an embodiment of the present disclosure is applied to a base station used for terminal access. The resume request signaling received by the base station at this time may be divided into two kinds: one is the resume request signaling sent by replacing other SIMs, and the other one is the resume request signaling sent for its own RNA update.

If one SIM replaces other SIMs to send the resume request signaling, the resume request signaling carries personal card information and the card information of a replaced SIM. The card information at least includes an identifier of a card. The personal identifier of a card may be used for the base station to send feedback signaling for the resume request signaling. The card information of the replaced SIM may be used for the RNA update on a corresponding SIM.

If the first SIM and the second SIM need to perform the RNA update at the same time, the at least one SIM to be RNA-updated further includes: the first SIM itself.

In some embodiments, as shown in FIG. 7, the method further includes S230. In S230, radio resource control (RRC) release signaling is sent to the first SIM after the RNA update is completed, and the RRC release signaling includes inactive state configuration after the RNA is updated.

After the RNA update is completed, the RRC release signaling may be sent to the first SIM and may notify the first SIM that the RNA update on the SIM that needs to perform the RNA update has been completed; and the first SIM is triggered to reenter an inactive state or an idle state.

The RRC release signaling further carries the inactive state configuration after the RNA is updated in an embodiment of the present disclosure. The RRC release signaling carries the inactive state configuration after the RNA is updated, which means that the inactive configuration after the RNA is updated is not sent by new signaling or additional signaling, such that signaling overhead is reduced, and the number of interaction times between the base station and the terminal is reduced.

In some embodiments, as shown in FIG. 6A, S220 may include steps S221A and S222A.

In step S221A, based on a base station identifier of an anchor base station to be RNA-updated in the card information, a request for obtaining context is sent to an anchor base station of the second SIM to be RNA-updated, where the request for obtaining context is configured to obtain context information.

In step S222A, the context information is received.

In some embodiments, as shown in FIG. 6B, the S220 may include steps S221B and S222B.

In step S221B, a path switching request is sent to a core network based on an identifier of a card to be RNA-updated in the card information, where the path switching request is configured to request the core network to update a transmission path of a second SIM.

In step S222B, a path switching request acknowledgment returned is received in response to the path switching request.

In this embodiment of the present disclosure, after receiving resume request signaling, a base station not only obtains context information of the SIM that requests the RNA update from a corresponding base station, but also requests path switching to the core network. For example, the base station sends the path switching request to an access management function (AMF) of the core network to request to update an information transmission path between core network and a corresponding SIM, for example, a path for information interaction between the core network and the SIM through the anchor base station before performing RNA update, to a path for information interaction between the core network and the SIM through the anchor base station after performing RNA update.

If the base station receives the path switching request acknowledgment, it indicates that the transmission path is switched successfully. If the base station obtains the context information of the corresponding SIM successfully and receives the switching request acknowledgment, it may be confirmed that the RNA update on the SIM is completed.

The base station may carry identifier of a card of a plurality of SIMs in a path switching request, such that switching of transmission paths of the plurality of SIMs is completed.

Figure 8:
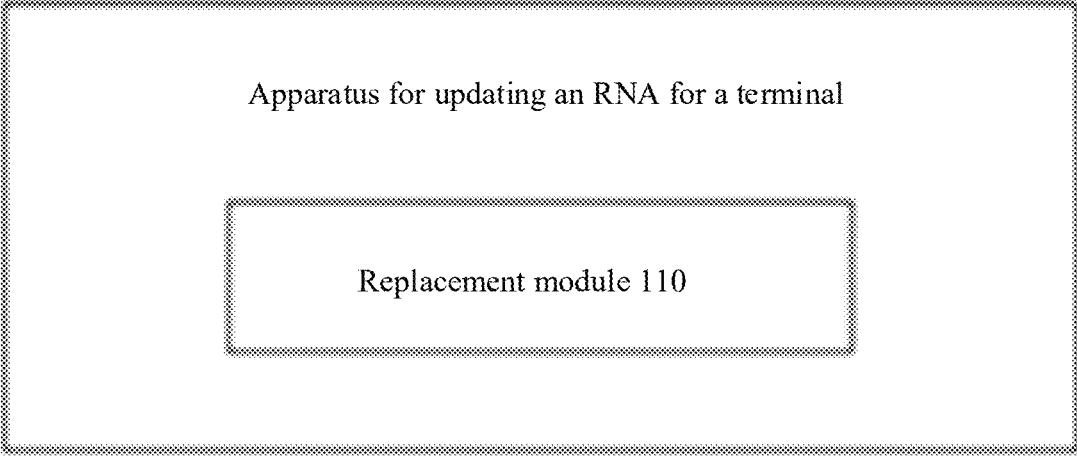
FIG. 8 is a schematic structural diagram of an apparatus for updating an RNA for a terminal according to an example.

As shown in FIG. 8, an embodiment of the present disclosure provides an apparatus 100 for updating an RNA for a terminal. The apparatus includes a replacement module 110 configured to perform RNA update by using one first subscriber identification module (SIM) in an inactive state of a multi-SIM terminal to replace at least one second SIM in the inactive state in the multi-SIM terminal.

In some embodiments, the replacement module 110 may be a program module. After being executed by a processor, the program module may implement performing an RNA update by triggering one SIM in the multi-SIM terminal to replace a plurality of other SIMs.

In some other embodiments, the replacement module 110 may be a software and hardware combination module. The software and hardware combination module includes, but is not limited to, a programmable array, and the programmable array includes, but is not limited to, a field programmable array or a complex programmable array.

In some other embodiments, the replacement module 110 may be a pure hardware module. The pure hardware module includes, but is not limited to, an application-specific integrated circuit.

In some embodiments, the apparatus 100 further includes a first receiving module configured to receive an RNA update configuration instruction for the multi-SIM terminal sent by a base station, and a first determination module configured to determine the first SIM replacing the second SIM to perform the RNA update based on the RNA update configuration instruction.

The RNA update configuration instruction may be used to indicate the first SIM in the multi-SIM terminal to replace at least one second SIM in the multi-SIM terminal to perform the RNA update.

In some embodiments, the replacement module 110 is configured to perform signal measurement of the multi-SIM terminal by the first SIM and perform the RNA update by using the first SIM to replace at least one second SIM in response to the signal measurement of the multi-SIM terminal triggering the RNA update.

In some embodiments, the apparatus 100 further includes an obtaining module configured to obtain an inactive state configuration of the second SIM by the first SIM; and a second determination module configured to determine the second SIM of which the RNA update is triggered by the terminal position update, based on the inactive state configuration of the second SIM. The inactive state configuration of the second SIM at least includes RNA information of the second SIM, and the RNA information is used to indicate an RNA in which the second SIM is located.

In some embodiments, the obtaining module is configured to receive the inactive state configuration of the second SIM from the base station by the first SIM before the first SIM enters the inactive state; or read the inactive state configuration of the second SIM from the second SIM by the first SIM in response to the first SIM being determined to replace the second SIM to perform the RNA update, where a multi-SIM terminal RNA update configuration instruction is used to indicate one SIM in the multi-SIM terminal to replace the SIM in the multi-SIM terminal to perform the RNA update.

In some embodiments, the obtaining module is configured to read the inactive state configuration of the second SIM from the second SIM by the first SIM after it is determined that the first SIM replaces the second SIM to perform the RNA update; or read the inactive state configuration of the second SIM from the second SIM by the first SIM when the first SIM is to be RNA-updated.

In some embodiments, the replacement module 110 is configured to send resume request signaling by the first SIM, where the resume request signaling includes: card information of the first SIM and card information of the second SIM; and the resume request signaling is used to trigger the base station to perform the RNA update on the first SIM and the second SIM based on the card information of the first SIM and the second SIM.

In some embodiments, the first receiving module receives radio resource control (RRC) release signaling sent after RNA update is completed by the first SIM, and the RRC release signaling includes the inactive state configuration after the RNA is updated; and the apparatus 100 further includes a transmission module configured to resume the first SIM to the inactive state after transmitting the inactive state configuration of the updated RNA of the second SIM to the second SIM.

In some embodiments, the card information of the first SIM includes: the identifier of a card of the first SIM and/or the base station identifier of the anchor base station of the first SIM; and/or, the card information of the second SIM includes: the identifier of a card of the second SIM and/or the base station identifier of the anchor base station of the second SIM.

In some embodiments, the replacement module 110 is further configured to monitor a paging message of the second SIM at a paging opportunity of the second SIM by the first SIM based on the inactive state configuration of the second SIM.

In some embodiments, the inactive state configuration of the first SIM is the same as the inactive state configuration of the second SIM, and the inactive state configuration includes RNA information used to determine the RNA and the paging configuration used to determine the paging opportunity for receiving the paging message.

Figure 9:
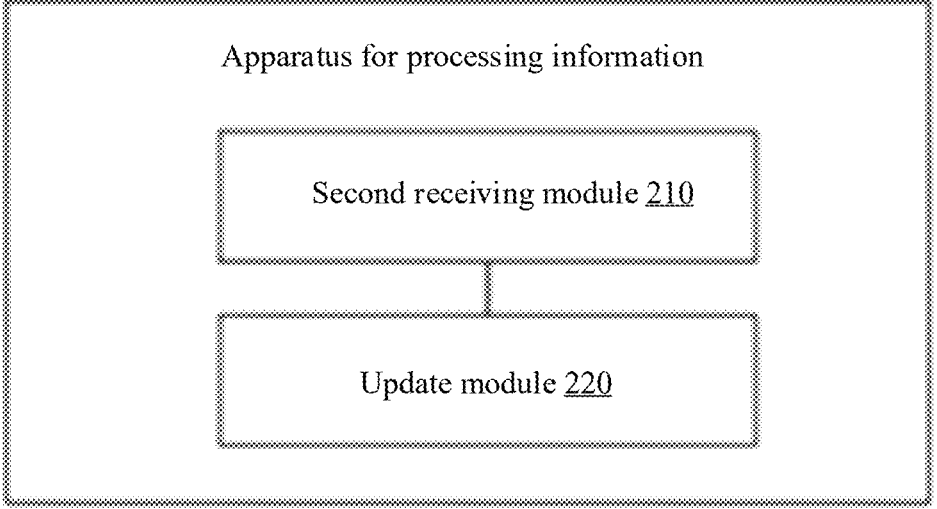
FIG. 9 is a schematic structural diagram of an apparatus for processing information according to an example.

As shown in FIG. 9, an embodiment of the present disclosure provides an apparatus 200 for processing information, including a second receiving module 210 configured to receive resume request signaling sent by a first subscriber identification module (SIM) in an inactive state in a multi-SIM terminal, where the resume request signaling carries card information of the first SIM and a second SIM. The second SIM is at least one SIM that is in the multi-SIM terminal, needs RNA update, is in the inactive state, and is in addition to the first SIM.

The apparatus 200 further includes an update module 220 configured to perform the RNA update on a second SIM to be RNA-updated, based on the card information carried by the resume request signaling.

In some embodiments, the second receiving module 210 and the update module 220 may be a program module, and after being executed by a processor, the program module may implement receiving of the resume request signaling carrying the card information, and the RNA update on the SIM.

In some other embodiments, the second receiving module 210 and the update module 220 may be a software and hardware combination module. The software and hardware combination module includes, but is not limited to, a programmable array, and the programmable array includes, but is not limited to, a field programmable array or a complex programmable array.

In some other embodiments, the second receiving module 210 and the update module 220 may be a pure hardware module; and the pure hardware module includes, but is not limited to, an application-specific integrated circuit.

In some embodiments, the apparatus 200 further includes a sending module configured to send radio resource control (RRC) release signaling to the first SIM after the RNA update is completed, and the RRC release signaling includes inactive state configuration after the RNA is updated.

In some embodiments, the update module 220 is configured to send a request for obtaining context to an anchor base station of the SIM to be RNA-updated, based on a base station identifier of an anchor base station to be RNA-updated in the card information, where the request for obtaining context is used to obtain context information. And the apparatus 200 further includes a third receiving module configured to receive the context information.

In some embodiments, the update module 220 is configured to send a path switching request to a core network based on an identifier of a card to be RNA-updated in the card information, where the path switching request is used to request the core network to update a transmission path of a second SIM. And the apparatus 200 further includes a fourth receiving module configured to receive the path switching request acknowledgment returned in response to the path switching request.

It is worth noting that if the first SIM and the second SIM need to perform the RNA update simultaneously, the request for obtaining context may further be sent to the anchor base station of the first SIM, and the context request information is received from the anchor base station of the first SIM.

In some other embodiments, if the first SIM and the second SIM need to perform the RNA update simultaneously, the path switching request may be further used to request the core network to update the transmission path of the first SIM.

The following provides specific examples in combination with any of the embodiments above. Under an RRC_INACTIVE state (that is, the foregoing inactive state), when a terminal is in the inactive state, a non-access stratum (NAS) still remains in a connected state (connection between the terminal and a core network is still remained), radio connection of the terminal is disconnected, and a base station side retains context information of the terminal and retains NG connection between the terminal and the core network.

The terminal may move within an area range configured by the base station without notifying the network, to save signaling overhead. When the terminal enters the inactive state, the last serving base station stores context of the terminal and NG connection between the terminal and a serving core network, and an AS layer of the terminal also retains corresponding context information including bearing, an identifier in the inactive state, an attribution area, etc. In such a manner, the base station may page the terminal in the inactive state by a radio access network paging mechanism within the configured area range, and the terminal may rapidly recover data transmission based on the context information stored on the terminal side and the base station side, to implement low-latency transmission.

With the development of radio communication technologies, there are more and more multi-SIM phones in the market. The processing manners for multi-SIM phones are mainly based on the implementation of various terminal manufacturers, without unified implementation standards, which leads to a plurality of different terminal behaviors and processing manners (e.g., dual SIM single standby, dual SIM dual standby for single pass, dual SIM dual standby for dual pass, etc.), and for multi-SIM terminals, the current networks all consider different SIMs to be different terminals, and each SIM independently in communication with the network without any cooperation with each other. This results in the base station and the multi-SIM terminal performing unnecessary operations, causing power consumption and signaling waste.

For multi-SIM terminals, the current networks all consider different SIMs to be different terminals, and each SIM independently communicates with the network without any cooperation with each other.

The terminal with two SIMs in the inactive state may reduce the number of radio area updates on the SIM in the inactive state, such that signaling overhead is reduced and the power of the terminal is saved.

Figure 10:
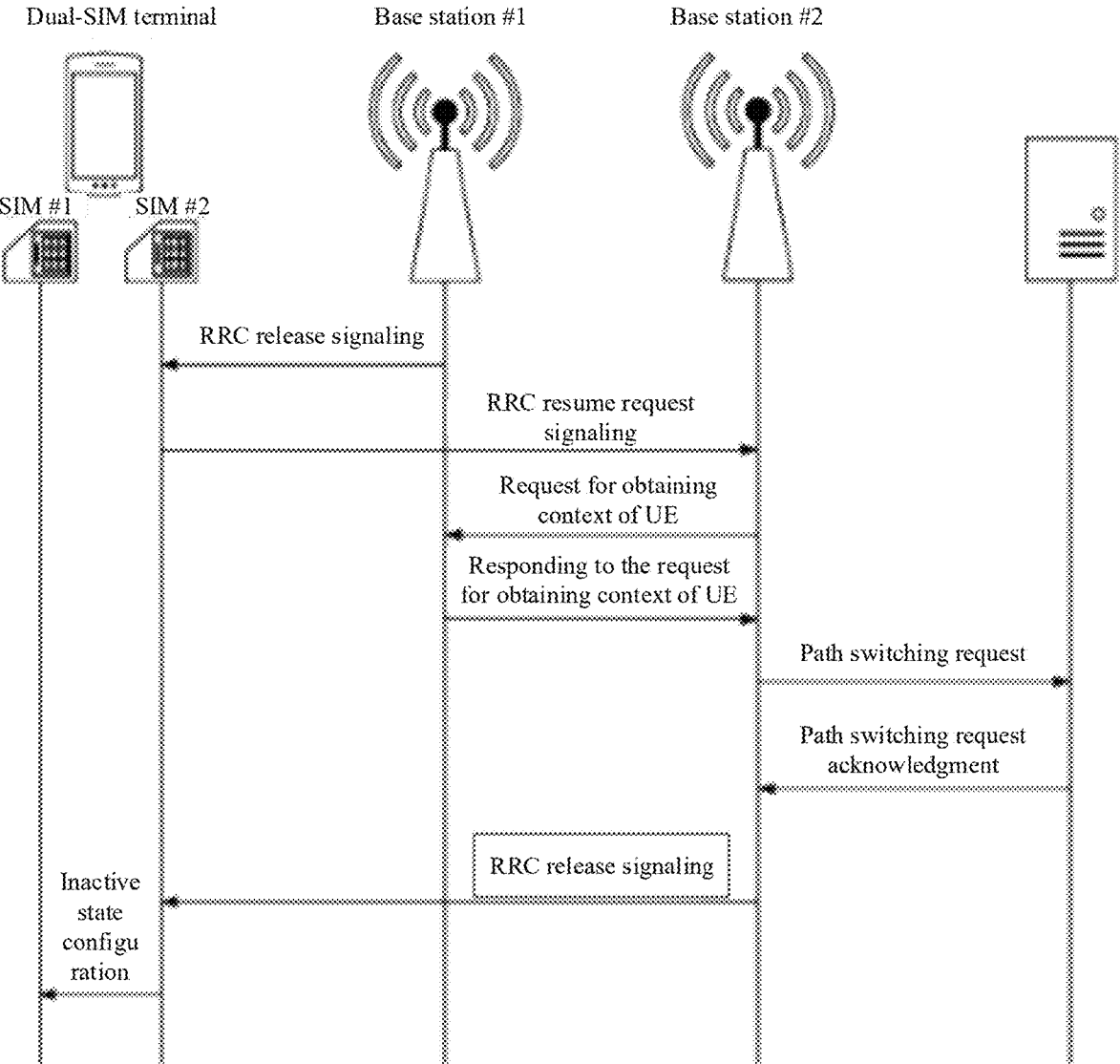
FIG. 10 is a schematic flowchart of a method for processing information according to an example.

For a scenario where the two SIMs are in an INACTIVE state, refer to FIG. 10, when a base station #1 needs to change a SIM #1 to be in the INACTIVE state, related parameters of the inactive state are configured for the SIM #1 by inactive state configuration in RRCRelease signaling (the inactive state configuration may also be referred to as suspend configuration, that is, suspendConfig). The parameters include an I-RNTI, a paging cycle (PagingCycle), RNA information (RNA-NotificationAreaInfo), T380, a next hop chaining count (NextHopChainingCount), etc.

The T380 may be a timer of cyclical RNA update.

The next hop chaining count may be used to update a security key of a terminal, generate a complete protection key based an updated security key, and perform complete protection verification, and if the complete protection verification successes, an encryption key continues to be generated, and indicates a PDCD to activate complete protection and an encryption function immediately, that is, the complete protection and the encryption function may be applied to information received and sent by the terminal subsequently.

When a base station #2 needs to change a SIM #2 to be in the INACTIVE state, related parameters of the inactive state is configured for the SIM #1 by the suspendConfig in the RRCRelease signaling, values of parameters related to the RNA update in these parameters may be consistent with homonymous parameters configured for the SIM #1. The homonymous parameters include the radio notification area information (RNA-NotificationAreaInfo), that is, the foregoing RNA information, and/or the paging cycle (PagingCycle). That is to say, the same radio notification area may be configured to the UE with the two SIMs in the INACTIVE state.

The base station #2 may be further configured when the two SIMs are in the INACTIVE state, and one SIM in the INACTIVE state is used to measure, for example, the SIM #1, and the other SIM in the INACTIVE state may not need to measure, for example, the SIM #2.

When configuring, the base station needs to tell the required information for restarting the SIM #2 to the SIM #1, such as the I-RNTI of the SIM #1. Or the base station may configure the SIM #1 to obtain the required information for restarting the SIM #2 from the SIM #2. An opportunity for the SIM #1 to obtain the information of the SIM #2 may be after the configuration of the base station is received, or may be when the SIM #1 needs to perform the RNAupdate. This opportunity may be determined based on the implementation of the terminal.

When a specified SIM #1 measures that the terminal moves to a base station #2 outside the configured RNA and needs to reside, the specified SIM #1 sends the RRCResumeRequest signaling to the base station #2 to request the RNA update. The RRCResumeRequest signaling is the foregoing resume request signaling.

The SIM #1 needs to report the information of the SIM #2 simultaneously in addition to the information of the SIM #1 in the RRCResume Request signaling.

After the base station #2 receives the RRCResume Request signaling including the SIM #1 and the SIM #2 sent by the SIM #1, the base station #2 sends RETRIEVE UE CONTEXT REQUEST signaling to the base station #1 and adds the information of the SIM #2 to the RETRIEVE UE CONTEXT REQUEST signaling. The RETRIEVE UE CONTEXT REQUEST signaling is a request or signaling for requesting context to an original anchor base station of the SIM. The information of the SIM #2 at least includes an identifier of a card of the SIM #2.

After the base station #1 receives the RETRIEVE UE CONTEXT REQUEST signaling sent by the base station #2, the base station #1 returns to the RETRIEVE UE CONTEXT REQUEST RESPONSE signaling and adds the information of the SIM #1 and the SIM #2 to the signaling.

After the base station #2 receives the information of the SIM #1 and the SIM #2, the base station #2 sends PATH SWITCH REQUEST signaling to an AMF, and adds the information of the SIM #1 and the SIM #2 to the signaling.

After the AMF receives the PATH SWITCH REQUEST signaling sent by the base station #2, the AMF sends PATH SWITCH REQUEST ACKNOWLEDGE signaling to the base station #2, the PATH SWITCH REQUEST ACKNOWLEDGE signaling including inactive state configuration recommendation for the SIM #1 and the SIM #2. The PATH SWITCH REQUEST signaling corresponds to the foregoing path switching request.

After the base station #2 receives the PATH SWITCH REQUEST ACKNOWLEDGE signaling, the base station #2 sends the RRCRelease signaling to the SIM #1, the RRCRelease signaling including inactive state configuration for the SIM #1 and the SIM #2.

The RRCRelease signaling is the foregoing RRC release signaling.

After the SIM #1 receives the RRCRelease signaling including the inactive states of the SIM #1 and the SIM #2 sent by the base station #2, the SIM #1 is changed to be in the inactive state, and sends the inactive state configuration of the SIM #2 to the SIM #2.

An embodiment of the present disclosure provides a communication device, including a processor, a transceiver, a memory, and executable programs stored in the memory and may be operated by the processor, where when executing the executable programs, the processor performs the method for updating the radio notification area (RNA) for a terminal and provided by any foregoing technical solutions, or performs the method for processing the information applied to the base station and provided by any foregoing technical solutions.

The communication device may be the foregoing base station or the UE.

The processor may include various types of storage mediums, and the storage medium is a non-transitory computer storage medium and can continue to memorize the information stored in the storage medium after the communication device is powered down. In this place, the communication device includes the base station and a user equipment.

The processor may be connected to the memory by a bus and the like and is used to read the executable programs stored in the memory, for example, at least one of FIGS. 2 to 6.

An embodiment of the present disclosure provides a non-transitory computer storage medium storing executable programs; and after being executed by a processor, the executable programs can perform the method shown in any technical solutions according to the first aspect or the second aspect, for example, at least one of FIGS. 2 to 6.

Figure 11:
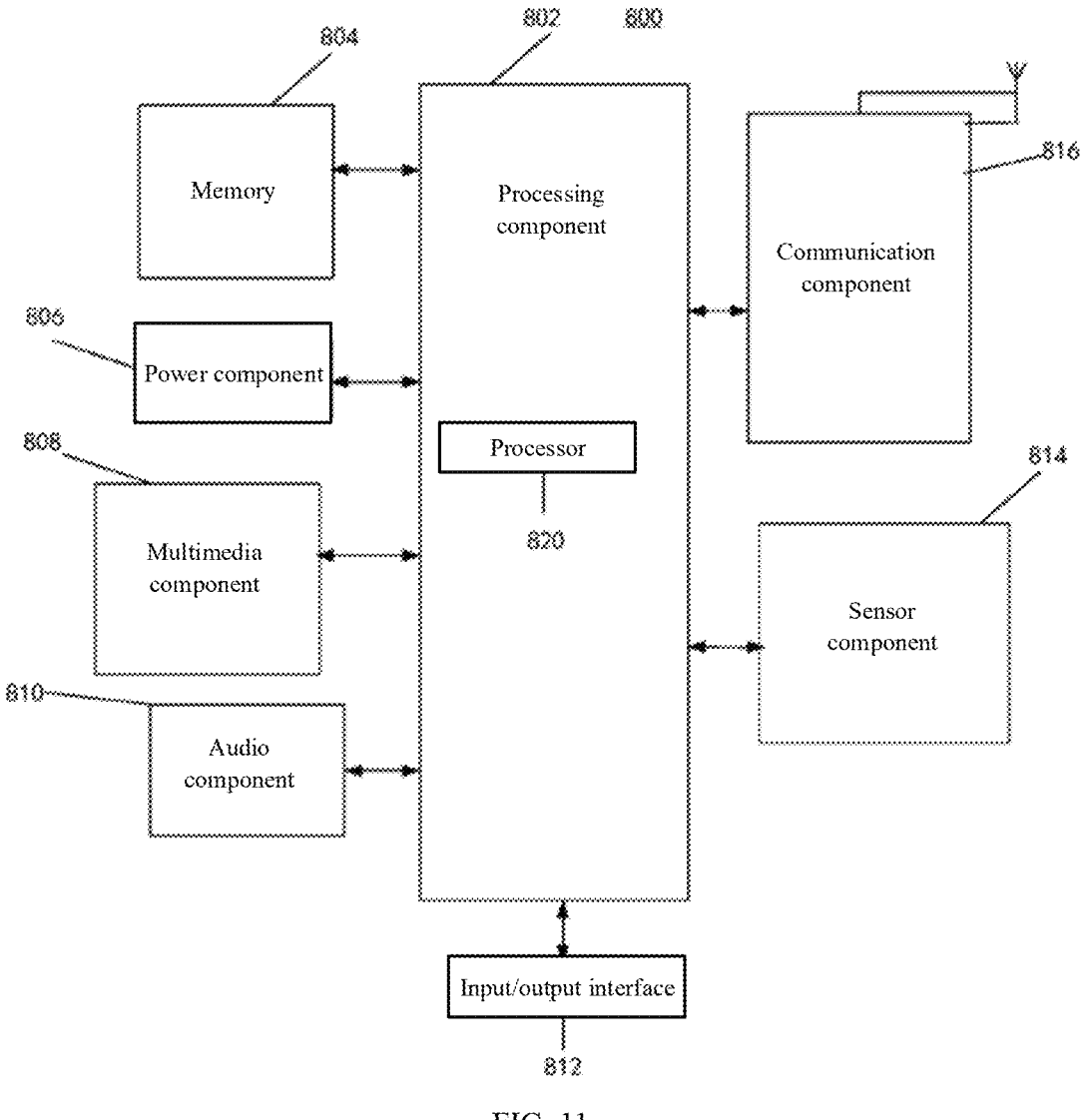
FIG. 11 is a schematic structural diagram of UE according to an example.

FIG. 11 is a block diagram of UE 800 according to an example. For example, the UE 800 may be a mobile phone, a computer, a digital broadcasting user equipment, a messaging device, a game console, a tablet device, a medical device, a fitness device, a personal digital assistant, etc.

Referring to FIG. 11, the UE 800 may include at least one of the following components: a processing component 802, a memory 804, a power component 806, a multimedia component 808, an audio component 810, an input/output (I/O) interface 812, a sensor component 814, and a communication component 816.

The processing component 802 usually controls the overall operations of the UE 800, such as operations associated with display, telephone call, data communication, camera operations, and recording operations. The processing component 802 may include at least one processor 820 to execute instructions to complete all of or part of the steps of the above method. In addition, the processing component 802 may include at least one module to facilitate the interaction between the processing component 802 and other components. For example, the processing component 802 may include a multimedia module to facilitate interaction between the multimedia component 808 and the processing component 802.

The memory 804 is configured to store various types of data to support the operations at the UE 800. Examples of these data include instructions for any application or method operated on the UE 800, contact data, phone book data, messages, pictures, videos, etc. The memory 804 may be implemented by any type of volatile or non-volatile storage device or a combination of the volatile device and the non-volatile storage device, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 806 provides power for various components of the UE 800. The power component 806 may include a power management system, at least one power source, and other components associated with power generation, management, and distribution of the UE 800.

The multimedia component 808 includes a screen for providing an output interface between the UE 800 and a user. In some embodiments, the screen may include a liquid crystal display (LCD) and a touch panel (TP). If the screen includes a touch panel, the screen may be implemented as a touch screen to receive input signals from the user. The touch panel includes at least one touch sensor to sense touches, slides, and gestures on the touch panel. The touch sensor may sense not only the boundary of the touch or slide but also the wake-up time and pressure associated with the touch or slide. In some embodiments, the multimedia component 808 includes a front camera and/or a rear camera. When the UE 800 is in an operation mode, such as a shooting mode or a video mode, the front camera and/or the rear camera can receive external multimedia data. Each front or rear camera may be a fixed optical lens system or have a focal length and optical zoom capability.

The audio component 810 is configured to output and/or input audio signals. For example, the audio component 810 includes a microphone (MIC), and when the UE 800 is in an operation mode, such as a call mode, a recording mode, or a voice recognition mode, the microphone is configured to receive external audio signals. The received audio signals may be further stored in the memory 804 or sent by the communication component 816. In some embodiments, the audio component 810 further includes a speaker for outputting audio signals.

The I/O interface 812 provides an interface between the processing component 802 and a peripheral interface module. The peripheral interface module may be a keyboard, a click wheel, buttons, etc. These buttons may include, but are not limited to, a home button, a volume button, a start button, and a lock button.

The sensor component 814 includes at least one sensor for providing various aspects of status assessment for the UE 800. For example, the sensor component 814 may detect an on/off state of the device 800, and relative positions of components such as a display and a keypad of the UE 800. The sensor component 814 may further detect a position change of the UE 800 or one component of the UE 800, the presence or absence of contact between the user and the UE 800, an orientation or acceleration/deceleration of the UE 800, and a temperature change of the UE 800. The sensor component 814 may include a proximity sensor configured to detect the presence of nearby objects without any physical contact. The sensor component 814 may also include an optical sensor, such as a CMOS or CCD image sensor, for use in imaging applications. In some embodiments, the sensor component 814 may further include an acceleration sensor, a gyro sensor, a magnetic sensor, a pressure sensor, or a temperature sensor.

The communication component 816 is configured to facilitate wired or wireless communication between the UE 800 and other devices. The UE 800 may access a wireless network based on communication standards, such as WiFi, 2G, 3G, or a combination of WiFi, 2G, and 3G. In an example, the communication component 816 receives broadcast signals or broadcast-associated information from an external broadcast management system via a broadcast channel. In an example, the communication component 816 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example, the UE 800 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronic components to perform the above method.

In an example, there is further provided a non-transitory computer-readable storage medium including instructions, such as a memory 804 including instructions and the instructions may be executed by the processor 820 of the UE 800 to complete the above method. For example, the non-transitory computer-readable storage medium may be a ROM, a random access memory (RAM), a CD-ROM, a magnetic tape, a floppy disk, an optical data storage device, etc.

Figure 12:
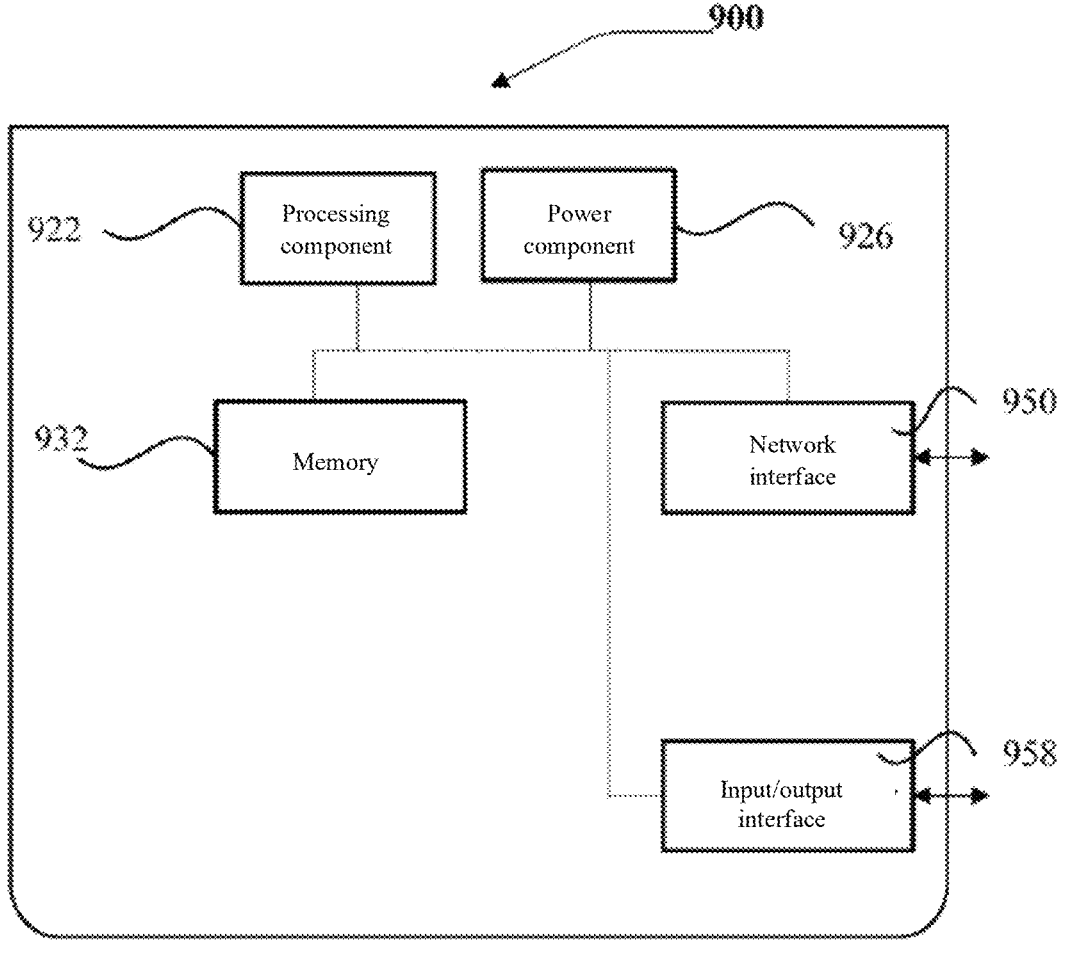
FIG. 12 is a schematic structural diagram of a base station according to an example.

As shown in FIG. 12, an embodiment of the present disclosure shows a structure of a base station. For example, a base station 900 may be provided as a network device. Referring to FIG. 12, the base station 900 includes a processing component 922, and further includes at least one processor, and a memory resource replaced by the memory 932, used to store instructions which may be executed by the processing component 922, such as applications. The applications stored in the memory 932 may include one or more modules, each corresponding to a set of instructions. In addition, the processing component 922 is configured to execute instructions, to execute any methods applied to the base station of the above methods, such as the methods shown in FIGS. 2 to 6.

The base station 900 may also include a power component 926 configured to execute power supply management on the base station 900, a wired or wireless network interface 950 configured to connect the base station 900 to a network, and an input/output (I/O) interface 958. The base station 900 may operate an operating system stored in the memory 932, such as Windows Server™, Mac OS X™, Unix™, Linux™, FreeBSD™, or the like.

Those skilled in the art would readily conceive of other implementations of the present disclosure after considering the specification and practicing the disclosure disclosed here. The present disclosure is intended to cover any variations, uses, or adaptive changes of the present disclosure. These variations, uses, or adaptive changes follow the general principle of the present disclosure and include common general knowledge or conventional technical means in the technical field that are not disclosed in the present disclosure. The description and the embodiments are merely regarded as exemplary, and the real scope and spirit of the disclosure are pointed out by the following claims.

It should be understood that the present disclosure is not limited to the precise structure described above and shown in the figures, and various modifications and changes can be made without departing from its scope. The scope of the present disclosure is only limited by the appended claims.

What is claimed is:

1. A method for updating a radio notification area (RNA) for a terminal, the method comprising:
performing an RNA update by using a first subscriber identification module (SIM) in an inactive state of a multi-SIM terminal to replace at least one second SIM in the inactive state in the multi-SIM terminal;
wherein the method further comprises:
receiving an RNA update configuration instruction for the multi-SIM terminal sent by a base station, wherein the RNA update configuration instruction is configured to indicate the first SIM in the multi-SIM terminal to replace at least one second SIM in the multi-SIM terminal to perform the RNA update; and
determining the first SIM replacing the second SIM to perform the RNA update, based on the RNA update configuration instruction;
wherein the method further comprises:
obtaining inactive state configuration of the second SIM by the first SIM; and
determining the second SIM for which the RNA update is triggered by a terminal position update, based on the inactive state configuration of the second SIM; and monitoring, by the first SIM, a paging message of the second SIM at a paging opportunity of the second SIM, based on the inactive state configuration of the second SIM;
wherein obtaining the inactive state configuration of the second SIM by the first SIM comprises:
reading the inactive state configuration of the second SIM from the second SIM by the first SIM, in response to the first SIM being determined to replace the second SIM to perform the RNA update;
wherein the inactive state configuration comprises:
RNA information configured to determine the RNA; and
a paging configuration configured to determine the paging opportunity for receiving the paging message; and
wherein the RNA information of the first SIM is the same as the RNA information of the second SIM in a case where the first SIM fails to read the RNA information of the second SIM; and the second SIM needs to perform the RNA update in a case where the first SIM measures that signal quality of the first SIM is poor enough to require the RNA update.

2. The method according to claim 1, wherein performing the RNA update by using the first subscriber identification module (SIM) in the inactive state of the multi-SIM terminal to replace the at least one second SIM in the inactive state in the multi-SIM terminal comprises:
performing signal measurement of the multi-SIM terminal by the first SIM; and
performing the RNA update by using the first SIM to replace at least one second SIM, in response to the signal measurement of the multi-SIM terminal triggering the RNA update.

3. The method according to claim 1, wherein the RNA information is further configured to indicate the RNA in which the second SIM is located.

4. The method according to claim 3, wherein obtaining the inactive state configuration of the second SIM by the first SIM further comprises:
receiving the inactive state configuration of the second SIM from the base station by the first SIM, before the first SIM enters the inactive state.

5. The method according to claim 1, wherein reading the inactive state configuration of the second SIM from the second SIM by the first SIM comprises:
reading the inactive state configuration of the second SIM from the second SIM by the first SIM after it is determined that the first SIM replaces the second SIM to perform the RNA update; or
reading the inactive state configuration of the second SIM from the second SIM by the first SIM in response to determining that the first SIM is to be RNA-updated.

6. The method according to claim 1, wherein performing the RNA update by using the first SIM to replace the at least one second SIM comprises:
sending resume request signaling by the first SIM, wherein the resume request signaling comprises: card information of the first SIM and card information of the second SIM; and the resume request signaling is configured to trigger the base station to perform the RNA update on the first SIM and the second SIM based on the card information of the first SIM and the second SIM.

7. The method according to claim 6, wherein the method further comprises:

receiving, by the first SIM, radio resource control (RRC) release signaling sent after the RNA update is completed, wherein the RRC release signaling comprises the inactive state configuration after the RNA is updated; and resuming the first SIM to the inactive state after transmitting the inactive state configuration of the updated RNA of the second SIM to the second SIM.

8. The method according to claim 6, wherein the card information of the first SIM comprises at least one of: an identifier of a card of the first SIM or a base station identifier of an anchor base station of the first SIM; and the card information of the second SIM comprises at least one of: an identifier of a card of the second SIM or a base station identifier of an anchor base station of the second SIM.

9. A non-transitory computer storage medium storing computer-executable instructions, wherein the computer-executable instructions, when executed by a processor, cause the processor to perform the method according to claim 1.

10. The method according to claim 1, wherein the first SIM and the second SIM access different public land mobile networks (PLMNs).

11. The method according to claim 1, the first SIM is selected based on at least one of the following:

usage frequency of a plurality of SIMs;

a master-slave configuration of the plurality of SIMs; or usage condition information related to paid fees of the plurality of SIMs.

12. The method according to claim 1, wherein the method further comprises:

reporting, by the first SIM, the paging message to a processor of the terminal when receiving the paging message; and triggering, by the processor, the second SIM to perform a state switch based on the paging message.

13. A method for processing information, comprising:

receiving resume request signaling sent by a first subscriber identification module (SIM) in an inactive state in a multi-SIM terminal, wherein the resume request signaling carries card information of the first SIM and a second SIM; and the second SIM comprises at least one SIM other than the first SIM, in an active state in the multi-SIM terminal and in need of an RNA update; and performing the RNA update on a second SIM to be RNA-updated based on the card information carried by the resume request signaling;

wherein performing the RNA update on at least one second SIM to be RNA-updated based on the card information carried by the resume request signaling comprises:

sending a path switching request to a core network based on an identifier of a card to be RNA-updated in the card information, wherein the path switching request is configured to request the core network to update a transmission path of a second SIM; and receiving path switching request acknowledgment returned in response to the path switching request;

wherein the second SIM is determined by the multi-SIM terminal based on inactive state configuration of the second SIM, and the inactive state configuration of the second SIM is read by the multi-SIM terminal from the second SIM by the first SIM, in response to the first SIM being determined to replace the second SIM to perform the RNA update; and the first SIM monitors a paging message of the second SIM at a paging opportunity of the second SIM, based on the inactive state configuration of the second SIM;

wherein the inactive state configuration comprises:

RNA information configured to determine the RNA; and a paging configuration configured to determine the paging opportunity for receiving the paging message; and wherein the RNA information of the first SIM is the same as the RNA information of the second SIM in a case where the first SIM fails to read the RNA information of the second SIM; and the second SIM needs to perform the RNA update in a case where the first SIM measures that signal quality of the first SIM is poor enough to require the RNA update.

14. The method according to claim 13, wherein the method further comprises:

sending radio resource control (RRC) release signaling to the first SIM after the RNA update is completed, wherein the RRC release signaling comprises the inactive state configuration after the RNA is updated.

15. The method according to claim 13, wherein performing the RNA update on the at least one second SIM to be RNA-updated based on the card information of the first SIM and the card information of the at least one second SIM carried by the resume request signaling comprises:

sending a request for obtaining context to an anchor base station of the second SIM to be RNA-updated, based on a base station identifier of an anchor base station to be RNA-updated in the card information, wherein the request for obtaining context is configured to obtain context information; and receiving the context information.

16. A communication device, comprising:

a transceiver;

a memory; and a processor, which is respectively connected to the transceiver and the memory, is configured to execute computer-executable instructions in the memory to control radio signal transceiving of the transceiver and to implement the method according to claim 13.

17. A non-transitory computer storage medium storing computer-executable instructions, wherein the computer-executable instructions, when executed by a processor, cause the processor to perform the method according to claim 13.

18. A communication device, comprising:

a transceiver;

a memory; and a processor, which is respectively connected to the transceiver and the memory, is configured to execute computer-executable instructions in the memory to:

control radio signal transceiving of the transceiver, and perform an RNA update by using a first subscriber identification module (SIM) in an inactive state of a multi-SIM terminal to replace at least one second SIM in the inactive state in the multi-SIM terminal;

wherein the processor is further configured to:

receive an RNA update configuration instruction for the multi-SIM terminal sent by a base station, wherein the RNA update configuration instruction is configured to indicate the first SIM in the multi-SIM terminal to replace at least one second SIM in the multi-SIM terminal to perform the RNA update; and determine the first SIM replacing the second SIM to perform the RNA update, based on the RNA update configuration instruction;

wherein the processor is further configured to:

obtain inactive state configuration of the second SIM by the first SIM; and determine the second SIM for which the RNA update is triggered by a terminal position update, based on the inactive state configuration of the second SIM; and monitor, by the first SIM, a paging message of the second SIM at a paging opportunity of the second SIM, based on the inactive state configuration of the second SIM;

wherein the processor is further configured to:

read the inactive state configuration of the second SIM from the second SIM by the first SIM, in response to the first SIM being determined to replace the second SIM to perform the RNA update;

wherein the inactive state configuration comprises:

RNA information configured to determine the RNA; and a paging configuration configured to determine the paging opportunity for receiving the paging message; and wherein the RNA information of the first SIM is the same as the RNA information of the second SIM in a case where the first SIM fails to read the RNA information of the second SIM; and the second SIM needs to perform the RNA update in a case where the first SIM measures that signal quality of the first SIM is poor enough to require the RNA update.

* * * * *